US006981494B1

(12) United States Patent
Bowman

(10) Patent No.: US 6,981,494 B1
(45) Date of Patent: Jan. 3, 2006

(54) TELESCOPING GUIDE FOR A CONCRETE SAW

(76) Inventor: Andrew Bowman, 4425 Helaine Dr., Franklin, OH (US) 45005

( * ) Notice: Subject to any disclaimer, the term of this patent is extended or adjusted under 35 U.S.C. 154(b) by 0 days.

(21) Appl. No.: 10/811,354

(22) Filed: Mar. 26, 2004

Related U.S. Application Data

(63) Continuation-in-part of application No. 10/127,971, filed on Apr. 23, 2002.

(51) Int. Cl.
*B28D 1/04* (2006.01)
(52) U.S. Cl. ............... 125/13.01; 125/14; 299/39.3
(58) Field of Classification Search ............ 125/13.01, 125/13.03, 12, 14, 15, 18; 299/39.3–39.9; 451/352
See application file for complete search history.

(56) References Cited

U.S. PATENT DOCUMENTS

| 2,468,336 | A | * | 4/1949 | Lewis ................ 299/39.3 |
|---|---|---|---|---|
| 2,673,725 | A | | 3/1954 | Coates |
| 2,736,544 | A | * | 2/1956 | Wright ................ 299/39.3 |
| 2,892,439 | A | * | 6/1959 | Dynia ................ 118/705 |
| 2,973,950 | A | * | 3/1961 | Tucker ................ 299/39.3 |
| 3,301,601 | A | * | 1/1967 | Zuzelo ................ 299/39.3 |
| 3,387,891 | A | | 6/1968 | Simms et al. |
| 3,464,737 | A | * | 9/1969 | Harclerode et al. ........ 299/39.4 |
| 3,785,705 | A | | 1/1974 | Binger et al. |
| 4,256,344 | A | | 3/1981 | Hatcher |
| 4,840,431 | A | | 6/1989 | Jedick |
| 5,176,426 | A | | 1/1993 | Adamson |
| 5,241,946 | A | | 9/1993 | Yelton et al. |
| 5,781,867 | A | | 7/1998 | Tidwell |
| 5,803,071 | A | | 9/1998 | Chiuminatta et al. |
| D404,042 | S | | 1/1999 | Allen |
| 5,941,227 | A | | 8/1999 | Bearden |
| 5,950,612 | A | | 9/1999 | Zuzelo et al. |
| 6,019,433 | A | | 2/2000 | Allen |
| 6,112,736 | A | | 9/2000 | Bearden |

* cited by examiner

*Primary Examiner*—Robert A. Rose
(74) *Attorney, Agent, or Firm*—R. William Graham

(57) ABSTRACT

A telescopic guide for a concrete saw includes a plurality of sleeves, a wheel and mounting plate.

2 Claims, 3 Drawing Sheets

TELESCOPING GUIDE FOR A CONCRETE SAW

This is a continuation-in-part of U.S. Ser. No. 10/127,971 filed Apr. 23, 2002 of which I claim the benefit thereof.

BACKGROUND OF THE INVENTION

1. Field of the Invention

The present invention relates in general to a guide for concrete saws. In particular, the present invention relates to an improved telescoping guide for a concrete saw for the accurately cutting along a predefined line in close proximity to walls and posts to better aid in performing grooving of uncured or green, in addition to cured concrete to aid in crack control.

2. Description of the Related Art

It is well known to provide grooves in concrete prevent cracks from running the length of the concrete surface. The groove in the concrete provides an area of reduced strength to ensure that the cracks which form during shrinkage of the concrete will be formed along the line of the groove rather than at some other point. This has important structural implications, in addition to reducing cost of damaged sections of concrete. Further, it provides a more aesthetically pleasing appearance.

Various concrete saws employ an arm which is pivotally connected to the housing of the saw which serves as a guide for the cutting of the grooves. As the saw approaches a wall or obstruction, the arm is lifted and the saw is enabled to further continue until its housing abuts the wall or obstruction. Still others have attempted a solution such as U.S. Pat. No. 5,941,227 to Bearden which discloses a fixed length arm which slides through a bracket and requires an open area behind the bracket and thus has limitations in its application and utility. Many of these prior art designs leave the operator to perform the remainder of the cut by eye without the aid of the guide. Others require substantial clearance in order to operate. There remains a need to improve upon such guides for concrete saws.

SUMMARY OF THE INVENTION

It is an object to improve guides for saws, particularly concrete saws.

Another object of the present invention is to ease the cutting of grooves in concrete.

Yet another object of the present invention is to provide a concrete saw which provides an improved a guide.

A further object of the present invention is to provide a telescoping guide for a concrete saw which may be used in confined areas and which will produce a cut which closely approaches an abutting or adjacent wall with increased accuracy and ability to follow predefined lines.

These and other objects are achieved by a telescoping guide for a concrete saw. The telescoping guide is connectable to the saw and includes a series, preferably at least three, of interconnected sleeves, wherein a first sleeve is of a given internal diameter includes a first end and a second end having a radially inwardly extending lip of a given diameter and a second sleeve having an intermediate portion of a given outer diameter less than the inner diameter of the radially inwardly extending lip of the first sleeve and includes a first end less than the inner diameter of the first sleeve and movably disposed adjacent thereto and greater than the diameter of the radially inwardly extending lip of the first sleeve to preclude movement thereby and having a second end having a radially inwardly extending lip. A third sleeve having an intermediate portion of a given outer diameter less than the inner diameter of the radially inwardly extending lip of the second sleeve and includes a first end less than the inner diameter of the second sleeve and movably disposed adjacent thereto and greater than the diameter of the radially inwardly extending lip of the second sleeve to preclude movement thereby and having a second end having a roller member rotatably connected thereto, wherein the roller member is of a diameter greater than the diameter of the radially inwardly extending lip of the second sleeve to preclude movement thereby.

A mounting plate can be hingedly connected to the first sleeve. A retainer is connected to the plate to retain the sleeves in a predetermined position, i.e., a pivot connection is provided to allow folding to a storage or travel position. Other possible embodiments may be made of the invention without departing from the scope thereof, it is to be understood that all matter herein set forth or shown in the accompanying drawings is to be interpreted as illustrative and not in a limiting sense.

BRIEF DESCRIPTION OF THE DRAWINGS

The objects and features of the invention noted above are explained in more detail with reference to the drawings in which like reference numerals denote like elements, and in which.

DETAILED DESCRIPTION OF THE INVENTION

Figure 1:
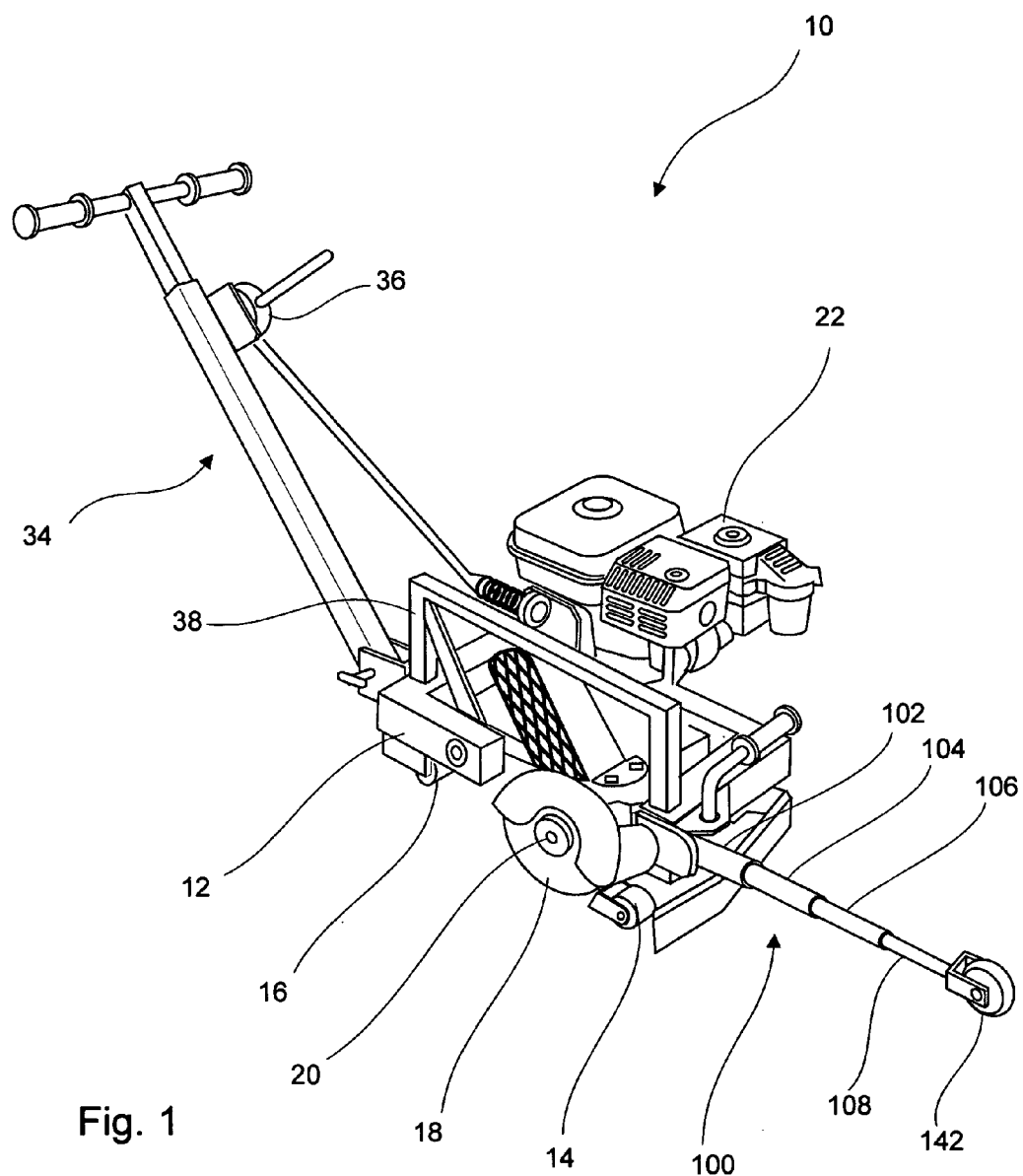
FIG. 1 is a perspective view of the saw which can be used with a guide of the present invention in the operative position.
Figure 2:
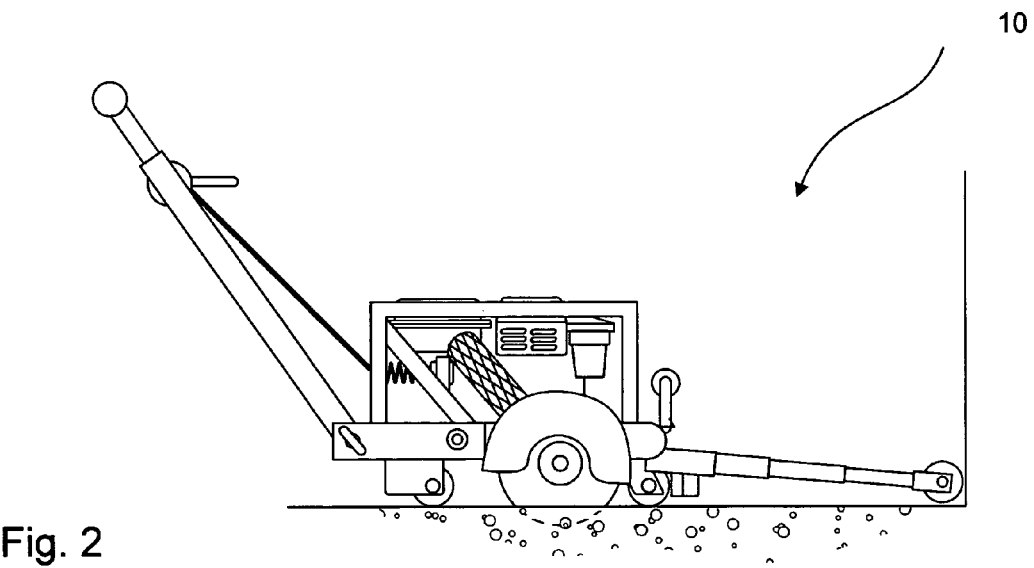
FIG. 2 is a side view of the saw which can be used with a guide of the present invention as it approaches a wall.
Figure 3:
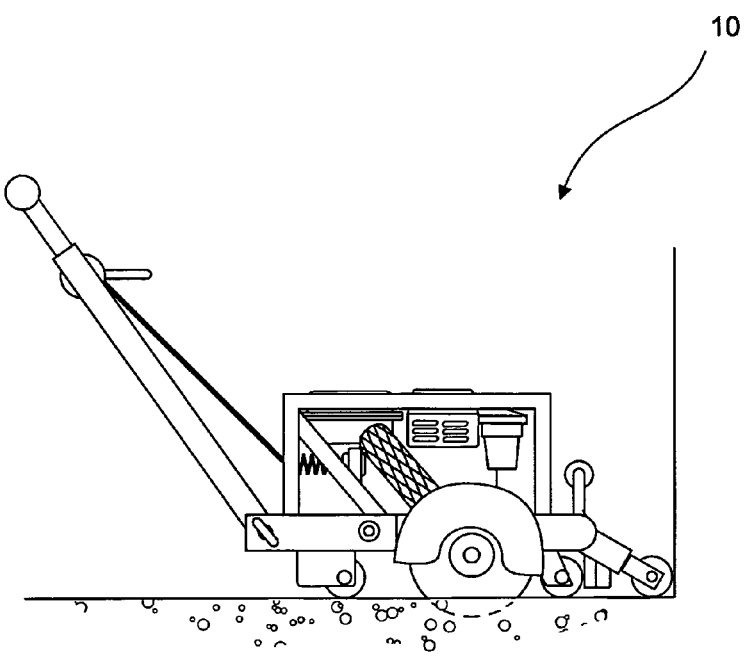
FIG. 3 is another side view of the saw which can be used with a guide of the present invention illustrating the guide's telescoping ability as it approaches a wall.

Referring to the drawings, a saw for use with telescoping guide according to the present invention is generally designated by reference numeral 10. With the exception of the novel improvements described hereinafter, components of the saw 10 which appear in the drawings are shown and described in the above noted U.S. Pat. No. 6,019,433 and are incorporated herein by reference.

The typical saw 10 includes a base 12 which is supported for movement with respect to the concrete by a pair of front wheels 14 and a pair of rear wheels 16. The front wheels 14 may be supported for movement with respect to the base 12 by individual axles mounted on the base 12 or a single axle as is known in the art. As is known, the saw 10 is to be capable of travel upon uncured concrete and the wheels 14 and 16 need to provide sufficient surface area for the saw's weight to ensure that the wheels do not mar the concrete surface.

The forward right hand side of the base 12 (with respect to the direction of travel) includes a blade 18 which is operably connected to a drive shaft 20 which in turn is operably connected to a motor 22. It should be understood to those skilled in the art that various drive arrangements can be employed to serve as the drive mechanism, such as a belt or direct drive system. As should be readily understood, the motor 22 will thus drive the blade 18 via the drive shaft 20.

Typically, the blade 18 extends laterally outward from the main portion of the base 12 to allow the user to more easily view the cutting blade 18 for purposes of cutting near adjacent walls or other obstacles. The blade 18 may be of any type suitable for the grooving of concrete, but is preferably an abrasion blade formed of compressed metal particles and may have a plurality of notches extending inwardly from the outer periphery, as is known in the art.

Blade 18 and wheel 14 are generally aligned with a forwardly mounted, deflectable pointer 24 which is aimed at the intended path of travel. Usually a suitable chalk line will be marked upon the concrete surface prior to cutting to guide the saw operator. Arm 26 is connected to the base 12 and leads to the adjustable pointer 24 that follows the chalk line. Arm 26 is telescopically formed wherein a female sleeve portion 28 pivotally connected to the base 12 receives a male portion 30. The female sleeve portion 28 and male portion 30 are so configured to limit the relative travel therebetween, which can be by way of a stop. The improved arm 26 enables the pointer 24 to stay adjacent the path to better enable the operator to guide the saw 10 when approaching the wall or obstruction.

The saw 10 is manually controlled with a handle assembly 34 which is connected to the base 12. The handle 34 supports a control mechanism 36 which is operably connected to the motor 22.

Figure 4:
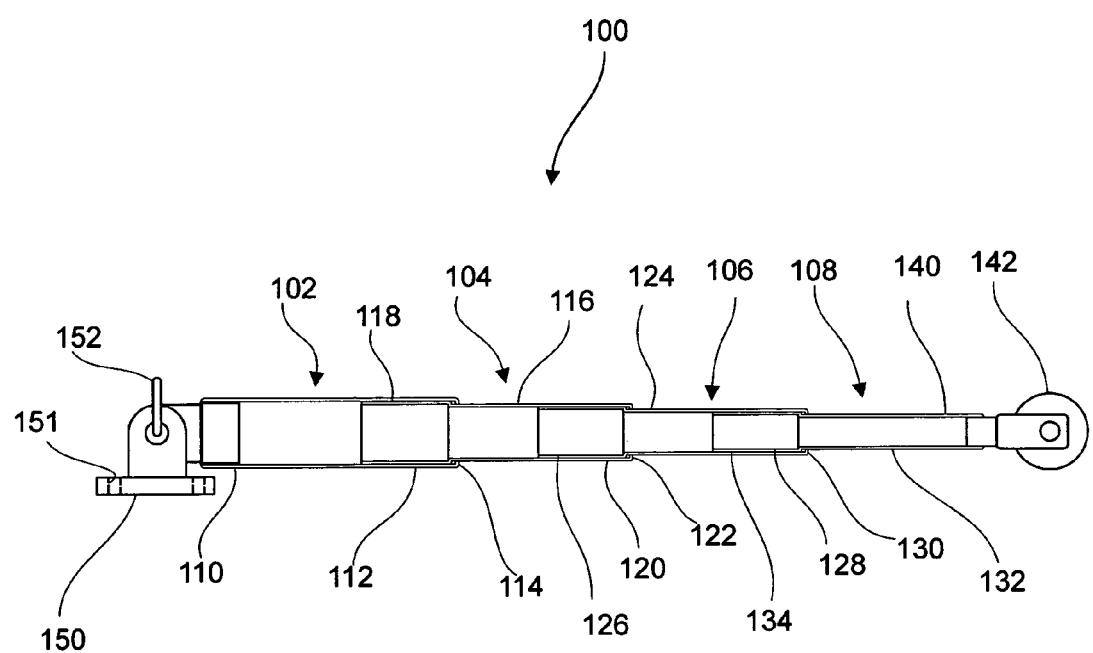
FIG. 4 is a sectional view of the telescoping guide of the invention.

The telescoping guide 100 is best seen in FIG. 4. The telescoping guide 100 is removably connectable to the saw 10 and includes a series, preferably at least three or more, of interconnected sleeves 102, 104, 106, 108. First sleeve 102 is of a given internal diameter and includes a first end 110 and a second end 112 having a radially inwardly extending lip 114 of a given diameter. Second sleeve 104 has an intermediate portion 116 of a given outer diameter less than the inner diameter of the radially inwardly extending lip 114 of the first sleeve 102 and includes a first end 118 less than the inner diameter of the first sleeve 102 and movably disposed adjacent thereto and greater than the diameter of the radially inwardly extending lip 114 of the first sleeve 102 to preclude movement thereby and has a second 120 end having a radially inwardly extending lip 122.

Third sleeve 106 has an intermediate portion 124 of a given outer diameter less than the inner diameter of the radially inwardly extending lip 122 of the second sleeve 104 and includes a first end 126 less than the inner diameter of the second sleeve 104 and movably disposed adjacent thereto and greater than the diameter of the radially inwardly extending lip 122 of the second sleeve 104 to preclude movement thereby and has a second end 128 having a radially inwardly extending lip 130. Fourth sleeve 108 has an intermediate portion 132 of a given outer diameter less than the inner diameter of the radially inwardly extending lip 130 of the third sleeve 106 and includes a first end 136 less than the inner diameter of the third sleeve 106 and movably disposed adjacent thereto and greater than the diameter of the radially inwardly extending lip 130 of the third sleeve 106 to preclude movement thereby and has a second end 140. Operably connected to the second end 140 is a roller member 142 (such as a wheel), wherein the roller member 142 is of a diameter greater than the diameter of the radially inwardly extending lip 114 of the first sleeve 102 to preclude movement by all lips 114, 122 and 130.

A mounting plate 150 having bores 151 can be hingedly connected to the first sleeve 102. A retainer 152 is connected to the sleeves 102 and is capable of being locked in a predetermined position.

From the foregoing, it will be seen that this invention is one well adapted to obtain all the ends and objects herein set forth, together with other advantages which are inherent to the structure. As many possible embodiments may be made of the invention without departing from the scope thereof, it is to be understood that all matter herein set forth or shown in the accompanying drawings is to be interpreted as illustrative and not in a limiting sense. Other saws might be adapted for use with the present invention. The above described embodiments are set forth by way of example and are not for the purpose of limiting the present invention. It will be readily apparent to those skilled in the art that obvious modifications, derivations and variations can be made to the embodiments without departing from the scope of the invention. Accordingly, the claims appended hereto should be read in their full scope including any such modifications, derivations and variations.

What is claimed is:

1. A motorized concrete saw having a telescoping guide, which includes:

a movable base, a cutting blade, means operably connected with said base for driving said blade such that when said base is disposed on a concrete surface, said cutting blade is enabled to cut a groove along an intended path in the concrete surface;

a telescoping guide connected to said saw in a manner to extend outward from a front end of said saw, said guide having a series of interconnected sleeves, wherein a first sleeve is of a given internal diameter and includes a first end and a second end having a radially inwardly extending lip of a given diameter and a second sleeve having an intermediate portion of a given outer diameter less than the inner diameter of the radially inwardly extending lip of the first sleeve and includes a first end less than the inner diameter of the first sleeve and movably disposed adjacent thereto and greater than the diameter of the radially inwardly extending lip of the first sleeve to preclude movement thereby and having a second end having a radially inwardly extending lip, a third sleeve having an intermediate portion of a given outer diameter less than the inner diameter of the radially inwardly extending lip of the second sleeve and includes a first end less than the inner diameter of the second sleeve and movably disposed adjacent thereto and greater than the diameter of the radially inwardly extending lip of the second sleeve to preclude movement thereby and having a second end;

a wheel rotatably connected to the second end of the third sleeve, wherein said wheel is of a diameter greater than the diameter of the radially inwardly extending lip of the second sleeve to preclude movement thereby;

a mounting plate hingedly connected to the first sleeve for connecting to said saw; and whereupon operation of said saw and said telescoping arm is an extended manner in front of said saw and said wheel is brought into contact with an opposing force, said wheel imparts a force on said arm to cause said third sleeve to slidably retract within said second sleeve and said second sleeve to slidably retract within said first sleeve.

2. The motorized concrete saw of claim 1, which further includes a retainer connected to the plate to retain the sleeves in a predetermined position.

* * * * *